United States Patent [19]
Humble

[11] 3,779,477
[45] Dec. 18, 1973

[54] FISHING REEL
[75] Inventor: Raymond Humble, Alnwick, England
[73] Assignee: Hardy Brothers (Alnwick) Limited, Willowburn, Alnwick, Northumberland, England
[22] Filed: Nov. 15, 1971
[21] Appl. No.: 198,904

[30] Foreign Application Priority Data
Nov. 26, 1970 Great Britain............... 56,224/70

[52] U.S. Cl.......... 242/84.1 R, 242/84.1 J, 242/215
[51] Int. Cl............................................. A01k 89/00
[58] Field of Search ................ 242/84.1 R, 84.1 K, 242/84.1 J, 215

[56] References Cited
UNITED STATES PATENTS
384,309  6/1888  Cordes................ 242/84.1 R
3,603,524  9/1971  Nurmse.................. 242/84.1 R
2,448,610  9/1948  Mandolf.................. 242/84.1 R
2,615,352  10/1952  Mies et al.............. 242/84.1 K Primary Examiner—Billy S. Taylor
Attorney—Richard K. Stevens et al.

[57] ABSTRACT

A fishing reel having a multiplying gear system with a unitary winding assembly which is easily and quickly detachable from the fishing line drum so that different winding assemblies can be interchanged which have different gearing ratios and so that different fishing line drums can be replaced in a simple manner. The fishing line drum rotates about a spindle fix to a backing plate which is mounted on the fishing rod. The fishing line drum is caused to rotate by a unitary winding assembly comprising at least two gears. The winding gear assembly has studs extending into socket means in the fishing line drum in order to engage and rotate the fishing line drum.

3 Claims, 4 Drawing Figures

PATENTED DEC 18 1973

PATENTED DEC 18 1973 3,779,477

FISHING REEL

This invention relates to fishing reels and in particular to reels of the type having a rotatable drum to carry a fishing line and in which the drum is driven through a gear system by a rotatable handle so that the drum rotates faster than the handle. Such type reels are well known in the art and generally termed "multiplier" reels.

The main purpose of a multiplier reel is to permit fast retrieval of line as, for example, may be necessary when fly fishing if a fish on the line swims directly towards the fisherman. Multiplier reels are generally of the "centre-pin" type in which the drum is rotatably mounted on a spindle which extends from a plate or frame adapted to be coupled, by conventional sliding or screw clamping rings, to a rod. Hitherto the gear system has been carried on the plate or frame at a position adjacent the drum and, to drive the gear system (and thereby the drum), the spindle is frequently of tubular form to permit a shaft to extend through it to a handle by which the drum is rotated through the gear system. In this way provision may be made for readily removing the drum and for substituting drums having different lines without disturbing the gear system. However, such a construction has generally proved to be quite expensive, particularly in the machining which is necessary in the plate or frame to receive the gear system and in the provision of a driving shaft through the spindle to the system. In addition, by incorporating the gear system in the plate or frame, it is generally the case that the ratio provided thereby cannot be changed for a given reel.

It is an object of the present invention to provide a fishing reel of the multiplier type by which the afore-mentioned drawbacks of hitherto proposed multiplier reels may be alleviated and which is capable of being manufactured relatively inexpensively.

According to the present invention there is provided a fishing reel which includes a mounting part intended to be fixed relative to a fishing rod, and a line drum rotatably mounted on a non-rotatable spindle carried by the mounting part the drum being located between the mounting part and a unified winding assembly carried by the spindle, said winding assembly comprising a gear system coupled to drive the drum and a rotatable handle coupled to drive the gear system and thereby the drum, the gear system providing a step-up ratio for rotation of the drum relative to rotation of the handle.

Generally the mounting part is in the form of, and for convenience will hereinafter be referred to as, a plate or frame.

Preferably, the winding assembly is removably mounted on the spindle and is conveniently releasably retained on the spindle by a spring loaded catch mechanism. The catch mechanism can readily be released so that the unified winding assembly may be interchanged with other assemblies to provide different ratios at which the drum may be rotated faster than rotation of the handle. Although the gear system may provide any pre-determined step-up ratio, it is believed, for practical purposes, that the maximum gear ratio required will be in the order of 3 to 1 whilst the preferred gear ratio will be in the range 1½ to 2¾.

Conveniently the unified winding assembly retains the drum on the spindle and, when the assembly is removed, the drum is preferably arranged to be readily removable from the spindle to permit other similar drums carrying fishing lines of different breaking strains to be used in the reel.

The gear system may be coupled to drive the drum by any convenient means such as engaging gear wheels of which one is fixedly mounted for rotation with the drum. However, a relatively inexpensive and preferred form of coupling is achieved by one or more lugs or studs on an output wheel of the gear system engaging in co-operating sockets or holes in a side face of the drum which lies adjacent to the winding assembly (or vice versa).

The gear system is preferably of the planetary type and in a simple form of construction comprises a fixed (non-rotatable) central gear wheel secured relative to the spindle (conveniently in co-axial relationship) and around which central gear wheel runs one or more free running gear wheels in mesh therewith. The free running gear wheel or wheels are carried on a driving plate which is mounted to be rotated by the handle. The free running gear wheel or wheels engage with the teeth of, and are located within the circumference of, an internal gear ring to which ring is coupled the drum. Rotation of the driving plate by the handle causes the free running gear wheel or wheels to run over and around the fixed central gear wheel and, in so doing, drives the internal gear ring and thereby the drum at a pre-determined step-up ratio.

A ratchet or reel-check mechanism as is known in the art may be provided between the drum and the plate or frame. Such mechanism is preferably adjustable and made in accordance with the disclosure in our British Pat. No. 1,170,478.

One embodiment of the present invention will now be described, by way of example only, with reference to the accompanying illustrative drawings in which.

Figure 1:
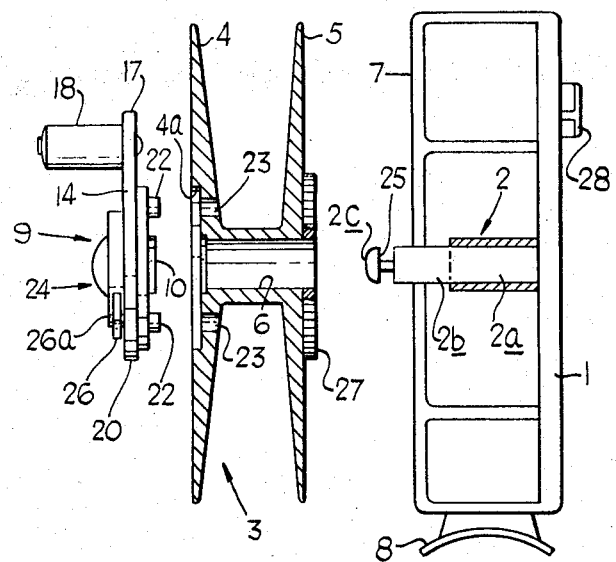
FIG. 1 is an exploded end elevation in part section, of a fishing reel constructed in accordance with the invention and illustrates the basic components of the reel.
Figure 2:
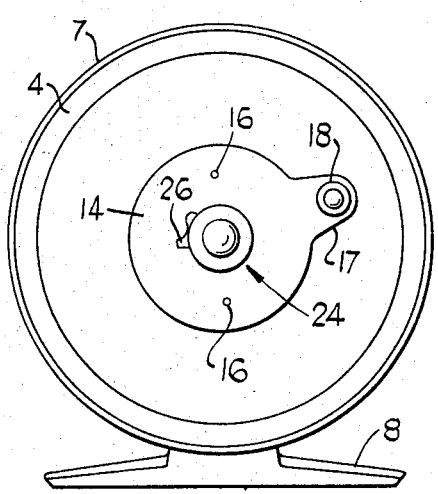
FIG. 2 is a side elevation of the reel.

The fishing reel comprises a plate 1 from which extends a non-rotatable spindle 2 on which is adapted to be rotatably mounted a drum in the form of a line spool 3 having opposed side faces 4 and 5. The spindle 2 has a cylindrical portion 2a which is slidably received in a complementary bore 6 of the spool so that the spool is located in a cylindrical cage 7 carried by the plate 1. The plate 1 further carries a bracket 8 by which the reel is intended to be attached to a fishing rod in conventional manner as, for example, by clamping rings (not shown). The spool 3 is retained on the spindle 2 by a unified winding assembly shown generally at 9 which is removably attached to the free end of the spindle 2 and is coupled to drive the spool 3 as will be described in greater detail hereinafter.

Figure 3:
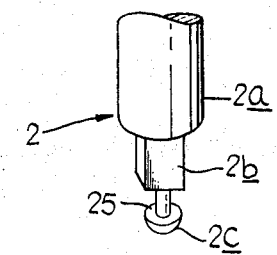
FIG. 3 is a perspective view of the unified winding assembly for the reel and which is partly cut away to illustrate the gearing system.
Figure 4:
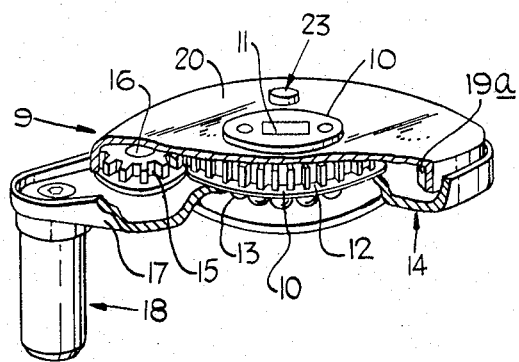
FIG. 4 is a radial section through the winding assembly when in an operative position on the reel.
Figure 4:
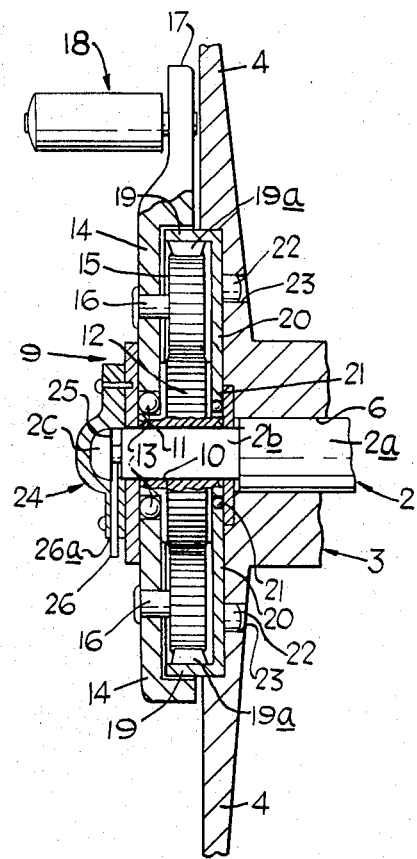

Referring particularly to FIGS. 3 and 4, the winding assembly 9 comprises a centre boss 10 having a socket 11 which receives, and by which the winding assembly is mounted on, the spindle 2. The centre boss 10 is not rotatable on the spindle 2 and for this purpose the part length 2b of the spindle 2 which engages with the socket 11 is of rectangular shape in radial section while the socket 11 is of complementary shape and is a close axially sliding fit with the spindle part 2b. The boss 10 carries a non-rotatable centre gear wheel 12 which is co-axial with the spindle 2. Rotatably mounted on the centre boss 10 (through bearings 13) is a driving plate 14 which carries a pair of gear wheels 15. The gear wheels 15 are freely mounted for rotation on pins 16 and are located on the driving plate 14 so that their teeth mesh with the teeth of the centre gear wheel 12 at diametrically opposed sides thereof. The driving plate 14 has a radially extending portion 17 which carries a handle 18 by which the driving plate, and thereby the gear wheels 15, are rotatable on the centre boss 10 about the axis of the spindle 2. The gear wheels 15 are mounted within the circumference of a gear ring 19 having internal teeth 19a which mesh with the teeth of the gear wheels 15. The gear ring 19 is formed on the flange of a driven plate 20 which is rotatably mounted (through bearings 21) on the centre boss 10. The driven plate 20 extends radially relative to the axis of the spindle 2 adjacent to the side face 4 and carries axially projecting studs 22 which engage in complementary holes 23 of the side plate 4 to couple the gear system to the spool 3.

As will be apparent from the aforegoing, the spool 3 is mounted on the spindle 2 between the plate 1 and the unified winding assembly 9. To retain both the spool and winding assembly on the spindle 2, the winding assembly incorporates a catch mechanism 24. The catch mechanism is secured to the centre boss 10 (conveniently by screws) to receive the free end 2c of the spindle which is provided with a circumferential recess 25. The mechanism 24 includes a lever 26 which is retained in a slot 26a and spring loaded (by means not shown) to be urged radially inwardly so that when the portions 2b and 2c are received in the winding assembly, the lever 26 is snapped into engagement with the recess 25 (see FIG. 4). To remove the winding assembly 9 and thereby allow removal of the spool 3, the lever 26 may be manually withdrawn against its spring action from the recess 25 to permit the components 9 and 3 to slide axially from the spindle 2. In this way another spool 3 carrying a fishing line of different breaking strain can be located on the spindle and/or a different winding assembly 9 can be coupled in the fishing reel to provide a different gear ratio between the handle 18 and spool 3.

With the reel assembled as shown (partially) in FIG. 4, rotation of the driving plate 14 by the handle 18 causes the gear wheels 15 to roll around the centre gear wheel 12 and thereby, through the gear ring 19 and studs 22, drive the spool 3 in a pre-determined step-up ratio relative to the driving plate 14.

The side face 4 of the spool with which the studs 22 engage is conveniently recessed at 4a to receive in complementary manner the adjacent portions of the driven plate 20 and centre boss 10.

A reel-check or ratchet mechanism (not shown) is provided between the plate 1 and spool 3 which mechanism is constructed in accordance with the disclosure in our British Pat. No. 1,170,478. For this purpose the spool 3 carries a co-axial ratchet wheel 27 which is fixedly secured on the side face 5 for engagement with a pivotally mounted ratchet (not shown) on the plate 1. An adjustment knob 28 is provided on the plate 1 rotation of which knob 28 varies the resistance to pivotal movement exhibited by the ratchet as it is tripped during rotation of the ratchet wheel and thereby varies the degree of check exhibited by the ratchet mechanism.

I claim:

1. A fishing reel which includes
a reel mounting part for attachment to a fishing rod;
a backing plate formed integrally with said reel mounting part;
a non-rotatable drum spindle carried by said backing plate and extending perpendicular thereto;
a line drum detachably and rotatably mounted on said drum spindle; said drum spindle protruding through said line drum;
a unitary winding assembly detachably mounted on the free end of said spindle protruding through said drum and lockable on said free end to retain the line drum on said drum spindle;
said unitary winding assembly comprising
a multiplying gear system having input means constituted by a manually operated winding handle and output means detachably engaging complementary means carried by the line drum so that on rotation of the winding handle the line drum is axially rotated through said output means and the angular velocity at which said winding handle is rotated is less than that at which the line drum is rotated, and wherein said output means and said complementary engaging means comprise axially engaging stud and socket means between said winding assembly and said line drum.

2. A fishing reel as claimed in claim 1, wherein said winding assembly includes front and rear cover plates and a system of gears carried between said plates; said front and rear cover plates being rotatably journalled on a boss co-axial with said drum spindle and said boss non-rotatably engaging part of the free end of said drum spindle; spring loaded catch means engageable with the free end of said drum spindle and carried by said boss for releasably retaining the boss and thereby said winding assembly on the drum spindle; said winding handle being carried by said front cover plate on the side of said winding assembly remote from the line drum and said output means being carried by said rear cover plate on the side of said winding assembly adjacent to the line drum; and wherein the said system of gears comprises an annular internal gear ring on said rear cover plate and rotatable therewith, a fixed gear wheel carried by said boss within said gear ring, said gear ring and fixed gear wheel being co-axial with the drum spindle, and at least one planetary gear wheel rotatably journalled on said front cover plate and engaging both said gear ring and said fixed gear wheel.

3. A fishing reel as claimed in claim 2, wherein said rear cover plate is seated in a substantially complementary recess in the adjacent radially extending side face of the line drum.

* * * * *